US006691235B1

United States Patent
Garcia et al.

(10) Patent No.: US 6,691,235 B1
(45) Date of Patent: Feb. 10, 2004

(54) AUTOMATIC VOLTAGE REGULATION FOR PROCESSORS HAVING DIFFERENT VOLTAGE REQUIREMENTS AND UNIFIED OR SPLIT VOLTAGE PLANES

(75) Inventors: Ray Garcia, Boca Raton, FL (US); Warren F. Huber, Groton, MA (US); Kendall A. Honeycutt, Boca Raton, FL (US); Stephen E. Still, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/627,093

(22) Filed: Jul. 27, 2000

(51) Int. Cl.[7] .............................. G06F 1/26; G05F 1/40
(52) U.S. Cl. ..................... 713/300; 713/320; 323/281; 323/285
(58) Field of Search ................................ 713/300, 320, 713/330; 323/285, 281

(56) References Cited

U.S. PATENT DOCUMENTS

| | | | |
|---|---|---|---|
| 4,941,175 A | | 7/1990 | Enescu et al. .................. 380/4 |
| 5,587,887 A | | 12/1996 | Price et al. .................... 361/794 |
| 5,632,039 A | * | 5/1997 | Walker et al. ................. 713/300 |
| 5,671,435 A | | 9/1997 | Alpert .......................... 395/800 |
| 5,732,207 A | | 3/1998 | Allen et al. ............... 395/182.03 |
| 5,757,171 A | * | 5/1998 | Babcock ....................... 323/271 |
| 5,758,171 A | | 5/1998 | Ramamurthy et al. . 395/750.01 |
| 5,774,736 A | | 6/1998 | Wright et al. .......... 395/750.07 |
| 5,794,066 A | | 8/1998 | Dreyer et al. .......... 395/800.32 |
| 5,818,206 A | * | 10/1998 | Titus et al. ................... 323/285 |
| 5,867,715 A | | 2/1999 | Lin et al. ............... 395/750.01 |
| 5,901,103 A | | 5/1999 | Harris, II et al. ............. 365/226 |
| 5,903,182 A | | 5/1999 | Jordan ......................... 327/540 |
| 5,919,259 A | | 7/1999 | Dahl ............................. 713/300 |
| 5,930,496 A | | 7/1999 | MacLaren et al. .......... 395/500 |
| 5,938,769 A | | 8/1999 | Hu ............................... 713/300 |
| 5,939,868 A | * | 8/1999 | Hall et al. .................... 323/281 |
| 5,951,681 A | | 9/1999 | Chang ............................. 713/1 |
| 5,983,346 A | | 11/1999 | Wendell ......................... 713/1 |
| 6,065,113 A | * | 5/2000 | Shiell et al. ................. 712/227 |
| 6,094,367 A | * | 7/2000 | Hsu et al. ....................... 363/78 |

FOREIGN PATENT DOCUMENTS

EP 0576772 A1 * 6/1992

OTHER PUBLICATIONS

Ali et al., "A programmable SCR-based AC voltage regulator", Industrial Automation and Control: Emerging Technologies, 1995., International IEEE/IAS Conference on May 22–27, 1995 Page(s): 524–529.*

* cited by examiner

Primary Examiner—Thomas Lee
Assistant Examiner—Chun Cao
(74) Attorney, Agent, or Firm—Ronald V. Davidse

(57) ABSTRACT

Apparatus for providing electrical power to a processor (CPU) within a computing system includes a fixed-voltage power supply and a programmable power supply. When the computing system is turned on, a switching circuit determines whether the processor is a unified voltage plane type, having a first particular pin electrically floating, or a split voltage plane type, having this pin grounded. In either case, the output of the programmable power supply is applied to the pins associated with the core voltage plane of a split voltage plane type. If the processor is a unified voltage plane type, the switching circuit applies the output of the programmable power supply to the pins associated with the I/O voltage plane of a split voltage plane type. If it is of a split voltage plane type, the switching circuit applies the output of the fixed-voltage power supply to an I/O voltage plane of the processor, with the programmable power supply being first set to generate a voltage determined by whether a second grounded pin is present in the processor. Then, an instruction in an initialization program causes the processor having a split voltage plane to transmit an identification code, which is used to determine a final level of the programmable power supply voltage.

21 Claims, 2 Drawing Sheets

AUTOMATIC VOLTAGE REGULATION FOR PROCESSORS HAVING DIFFERENT VOLTAGE REQUIREMENTS AND UNIFIED OR SPLIT VOLTAGE PLANES

BACKGROUND INFORMATION

1. Field of Invention

This invention relates to a method for automatically setting voltage levels among otherwise interchangeable CPUs, and, more particularly, to a method for determining whether a CPU is a single-voltage device having a unified voltage plane or dual-voltage device having split voltage planes, for determining which voltage(s) are to be applied to the CPU, and for applying appropriate voltage(s) to the CPU voltage plane(s).

2. Description of the Related Art

There are many central processing units (CPUs) which can be used interchangeability within computing systems. This interchangeability promotes an ability to use multiple CPU sources in the manufacture of similar computing systems and to replace one type of CPU with another, in order to repair a computing system having a failing CPU or in order to upgrade the computing system with features available with a new CPU.

A serious obstacle to many types of CPU interchangeability lies in the different voltage requirements of various CPUs. For example, many conventional types of Intel PENTIUM processors, such as model #P54 CTA, use a unified voltage plane (UVP), with the same supply voltage being applied to all voltage pins of the CPU, while the Intel PENTIUM MMX processors, such as model #P55C, use a split voltage plane (SVP), so that a core voltage can be applied to certain pins of the processor while an I/O voltage is applied to other pins of the processor. CPUs from other manufacturers follow a similar pattern, with UVP types requiring a single voltage, and with SVP types requiring two different voltages. In addition to configurational variations in the number of voltage levels required, the individual voltage level requirements vary from one CPU manufacturer to another and among the various models of a single manufacturer. A single pin, generally labeled VCC2DET, is provided in various similar types of processors to aid in the determination of the core voltage of the CPU. This pin is either grounded or floating. Certain CPUs from AMD also provide a second pin for voltage identification. However, these pins are inadequate for distinguishing among the different configurations and voltage levels. Thus, what is needed is a method for distinguishing between UVP-type and SVP-type CPUs and for determining the voltage(s) which should be applied to a particular installed CPU.

A conventional voltage regulation circuit for supplying voltage to a CPU has a DC to DC converter, a feedback resistor and a fixed resistor. The output voltage of the DC to DC converter is returned to the input of this converter through the feedback resistor, and the fixed resistor is tied between the input of the converter and electrical ground. The values of the feedback resistor and the fixed resistor determine the output voltage of the DC to DC converter. This circuit is made variable, so that several voltages needed by various CPUs can be alternately produced, by replacing the feedback resistor with several resistors wired in a parallel circuit, with these resistors being individually selectable through the use of DIP switches or jumpers. The difficulties associated with setting the DIP switches or jumpers properly, together with the possible occurrence of defective contact surfaces due to oxidation, are disadvantages of this method.

U.S. Pat. No. 5,867,715 describes an apparatus for programmably converting the operating voltage of the CPU and chipset by means of the firmware programmably setting the operating voltage, instead of by means of adjusting jumpers. The apparatus includes an address decoder unit, a programmable data memory, a DC to DC converter and a feedback resistance switching circuit. In operation, the CPU and chipset output an address signal and digital data which is decoded by an address decoder unit. After identifying the address data, the address decoder unit generates a trigger signal and writes input data specifying the operating voltage to a programmable data memory, which is a non-volatile device, such as a FLASH EEPROM or an EEPROM programmed through the use of a programmable burner operating in response to the data from the address decoder unit. Output signals from the programmable data memory drive inputs to a feedback resistance switching circuit, so that the resistance of the feedback path of the DC to DC converter is varied according to data stored in the programmable data memory. Since the programmable data memory is nonvolatile, the data is not lost when the computing system is turned off and on. However, if the CPU is to be replaced, it must be replaced with the system turned off. If this occurs, and if the replacement CPU has different voltage requirements than the CPU which has been replaced, this apparatus does not provide an automatic means for changing the operating voltage. Thus, what is needed is a system which determines the operating voltage in an automatic fashion as the computing system is turned on.

U.S. Pat. No. 5,632,039 describes a circuit that automatically switches the power supply voltage PVDD provided to a CPU between 3.3 volts and 5 volts. The circuit detects whether the CPU installed in a socket is a 3.3-volt part or a 5-volt part by determining the state of a voltage detect sense pin provided by the socket. If the voltage detect sense pin is driven low, that indicates a 3.3-volt CPU is being used. If a 5-volt CPU is installed, the voltage detect sense pin is left floating by the CPU, which allows a pullup resistor to pull the voltage detect sense pin high. The power supply voltage provided to the CPU is regulated through a power field effect transistor (FET). The gate of the power FET is connected to the output of a voltage reference source and is coupled to a 12-volt supply signal. If the voltage detect sense pin is pulled high, the voltage reference source is turned off, allowing the 12-volt signal to drive the gate of the power FET. This in turn allows the power FET to pass a 5-volt supply signal to the CPU supply signal PVDD. If the voltage detect sense pin is pulled low, the voltage reference source is turned on to drive the gate of the power FET to approximately one threshold voltage above 3.3 volts. In response, the power FET passes only 3.3 volts to the CPU supply signal PVDD.

One method for providing for the use of both UVP and SVP processor types on a single mother board requires a physical connection or disconnection between the core and I/O voltage planes within the motherboard. For a UVP processor, these voltage planes are tied together by jumpers or low resistance resistors. For an SVP processor, these jumpers or resistors are removed, with these voltage planes being connected to separate power supplies. If they are soldered in placed, they must be unsoldered. This requirement for proper identification of the processor type and for physical manipulation of the motherboard creates a risk of processor damage if the jumpers are incorrectly installed for the processor being used. What is needed is a method for automatically identifying whether the processor is UVP or SVP type and for making the appropriate electrical connections without requiring operator intervention.

A second method for providing for the use of both UVP and SVP processor types on a single mother board requires the mother board to be configured with split voltage planes, which are not connected to one another. To convert the mother board for use with a UVP processor, the respective voltage planes of the mother board are coupled inside the processor package. A single voltage is supplied to the core voltage plane of the mother board, and the I/O voltage plane of the mother board is then supplied with voltage through the lead frame. Since electrical power for the I/O voltage plane within the UVP processor, and possibly for other devices on the motherboard, must be fed through the lead frame of the processor system requirements may easily exceed the specifications of the processor. What is needed is a method for automatically switching the I/O voltage plane without causing current for the I/O voltage plane to be drawn through the lead frame.

U.S. Pat. No. 5,737,171 describes a embodiment providing a voltage comparator that senses whether a processor coupled to a mother board is a unified or split voltage plane type. Initially, when power is applied to the mother board 1, the voltage regulators are set with a core regulator supplying a correct core voltage, such as 3.3 volts, to pins which would be connected to the core voltage plane of a split voltage plane processor, and with an I/O regulator supplying its lowest voltage, such as 1.25 volts, to pins which would be connected to the I/O voltage plane of a split voltage plane processor. If the processor is a UVP type, the core voltage, less a voltage drop due to resistance within the processor package is driven into the I/O voltage plane, causing the I/O regulator, operating at a much lower voltage, to shut down. If the processor is an SVP type, the I/O voltage remains at 1.25 volts. After the POWERGOOD signal from the power supply reaches a logic high level, indicating that the system voltages are at valid states, latches are set to hold a multiplexer providing inputs to a voltage regulator at the necessary levels. The voltage level of the VCC2DET pin is also used to:vary the output voltage of the core regulator by switching a P-channel FET to change the voltage applied to an input pin of the regulator.

Intel PENTIUM Pro processors operate optimally at a voltage supply level specified by the manufacturer for each individual unit. U.S. Pat. No. 5,774,736 describes a fault-tolerant system having two such processors, each of which is powered by the output of a DC-DC converter. Each DC-DC converter provides a voltage in accordance with a four-bit voltage selection code VIDA<3..0> provided, in a first embodiment, through the settings of DIP switches, or, in a second embodiment, through programming provided by the CPU. While this system provides for voltage adjustments to accommodate a particular type of CPU requiring such adjustments for individual devices, what is needed is voltage adjusting circuitry usable with a number of different types of CPUs, and, particularly with CPUs having both single and dual voltage requirements.

Modern but conventional processors include means for providing an identifier, often called a CPUID, in response to a query for such information by the software of a computer system. An example of apparatus for providing such information is found in U.S. Pat. No. 5,671,435, which describes the use of a specialized set of read-only identification (ID) registers to store information relating to a microprocessor and its associated attributes, so that microcode is not needed to sequence through steps to obtain such processor identification. When the processor is manufactured, corresponding processor information is programmed into the ID registers. Later, when the processor is being used, software can generate a simple instruction to access registers to retrieve information that identifies the processor and its attributes. The software can access a base ID (or identifier) register which includes family (type) model, and step ID for the processor, as well as the number of "name" and "feature" registers present for conveying additional information pertaining to these attributes.

Another example of apparatus for providing processor identifying information is found in U.S. Pat. No. 5,794,066, which describes a multi-level identification apparatus and method for providing at least two types of identifying information, including a first type for identifying the origin of the microprocessor and the number of levels of identification information available, and a second type for identifying a family, a model, a stepping ID, and features of the microprocessor. The apparatus includes first and second memory elements and control logic for executing an ID instruction, storing data in one or more general registers for selective reading by a program. This method is available at any time while the microprocessor is running.

What is needed is a method for using the processor identifying information stored within the processor to determine the exact operating core voltage for the processor, so that it will be operated according to the correct specifications.

SUMMARY OF THE INVENTION

In accordance with a first aspect of the present invention, apparatus is provided for providing electrical power within a computing system, with the apparatus including a programmable power supply, instruction storage, decode logic, first and second data connections, and a first electrical power supply line. The programmable power supply produces a variable output voltage as a function of a program input code. The instruction storage, which is accessed by the processor during each power initialization sequence, holds a program for execution within the processor. This program includes an instruction causing the processor to provide a processor identifying code indicating a type of the processor. The processor identifying code is transmitted over the first data connection, between the processor and the decode logic. The program input code is transmitted over the second data connection, between the decode logic and the programmable power supply. Electrical current is driven along the first electrical power supply line between the programmable power supply and a first power input to the processor. The programmable power supply is preferably implemented as a DC to DC convertor having a number of input pins to which the program input code is applied. The decode logic preferably includes a register storing data, determined from the processor identifying code, so that the program input code is continuously generated.

The first power input to the processor is preferably those processor pins which are connected to the core voltage plane of a split-voltage plane type of processor, while the second power input to the processor is preferably those processor pins which are connected to the I/O voltage plane of a split-voltage plane type of processor. Since, when a new processor is installed, it is undetermined whether it is a unified- or split-voltage plane type, these are treated as separate voltage inputs, even through they may be electrically connected within the processor chip in a unified-voltage-plane processor.

In accordance with a second aspect of the present invention, apparatus is provided for providing electrical power having first and second power inputs within a computing system, with the apparatus including a first power supply connected to the first power input of the processor, a second power supply and a switching circuit. The switching circuit determines if the processor is a unified voltage plane type or a split voltage plane type, and connects the first power supply to the second power input of the processor if the processor is of the unified voltage plane type and connects the second power supply to the second power input of the processor if the processor is of the split voltage plane type.

In accordance with a third aspect of the present invention, a determination is first made, after power-on, of whether a processor is of a unified voltage plane type or a split voltage plane type. If the processor is of the unified voltage plane type, a first voltage level is applied to first and second power inputs of the processor. If the processor is of the split voltage plane type, the first voltage is applied to the second power input of the processor, and a second voltage is applied to the first power input of the processor. The processor then begins running an initialization program. An instruction within the initialization program causes the processor to transmit a processor identifying code to decode logic, which causes a third voltage to be applied to the first power input of the processor, with the third voltage being determined as a function of the processor identifying code. Preferably, the processor is determined to be a unified voltage plane if a first pin of the processor is determined to be electrically floating and to be a split voltage plane type if the first pin is determined to be electrically grounded. Preferably, the second voltage is determined in accordance with whether a second pin of the processor is absent or present and electrically grounded.

DESCRIPTION OF THE INVENTION

Figure 1:
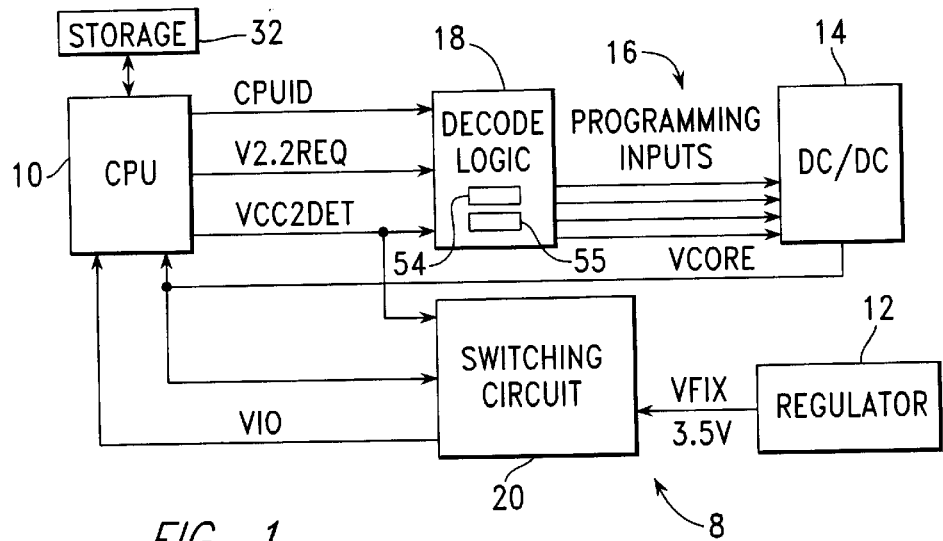
FIG. 1 is a block diagram showing apparatus built in accordance with the present invention to determine a processor type and to supply appropriate voltage levels to the processor.

FIG. 1 is a block diagram showing apparatus 8 built in accordance with the present invention to determine the type of a processor 10 and to supply one or two levels of voltage to voltage plane(s) of the processor 10. This apparatus includes a conventional voltage regulator 12 supplying 3.5 volts to various devices within the computing device, of which the apparatus of FIG. 1 is a part, and a programmable DC to DC convertor 14 producing a voltage VCORE in response to the conditions of various programming inputs 16. Each of the programming inputs 16 is directed to a programming pin of the DC to DC convertor 14.

The processor 10 is either a unified voltage plane (UVP) type, having a set of voltage pins to which a single voltage is applied, or a split voltage plane (SVP) type, having a set of core voltage pins to which a core voltage VCORE is applied and a set of I/O voltage pins to which an I/O voltage VIO is applied. The apparatus of FIG. 1 also includes decode logic 18, which provides programming input signals to determine the output voltage of the DC to DC convertor 14, and a switching circuit 20, which determines the manner in which voltage is supplied to the voltage pins of the processor 10 to which the I/O voltage is applied in the event that the processor 10 is an SVP type.

Figure 2:
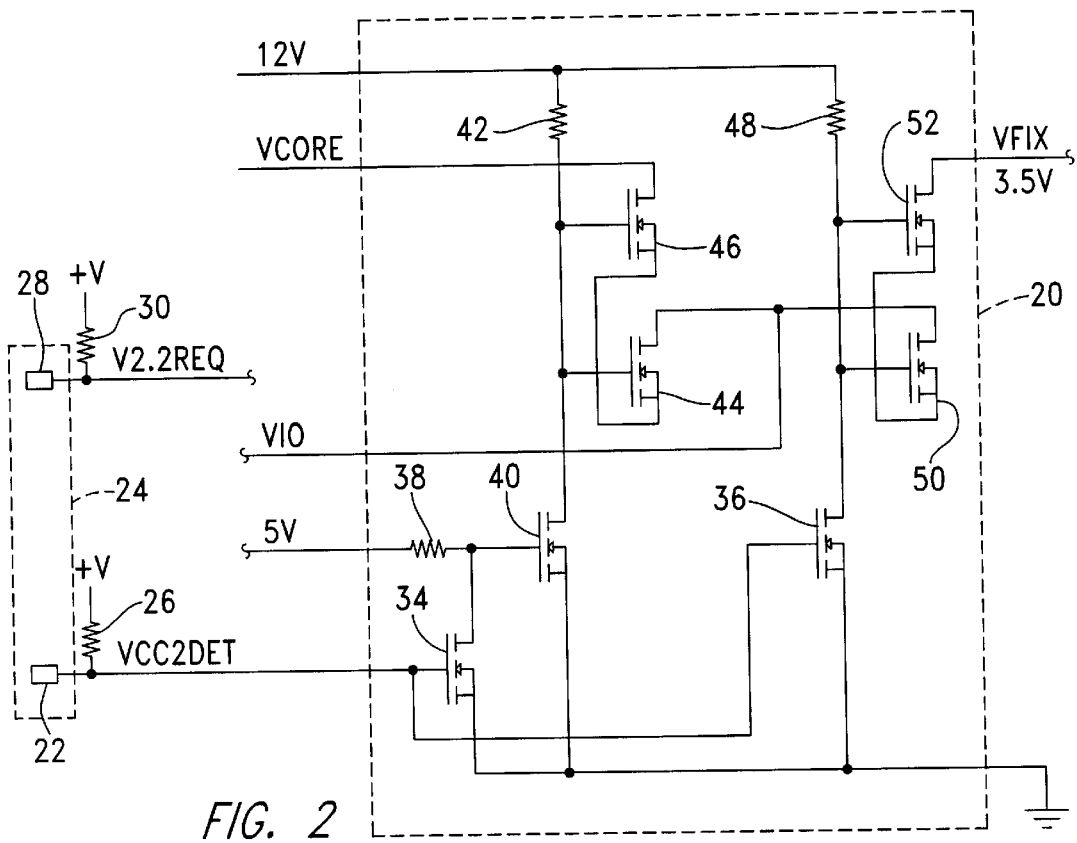
FIG. 2 is schematic view of a switching circuit within the apparatus of FIG. 1.

FIG. 2 is a schematic view of the switching circuit 20.

Referring to FIGS. 1 and 2, the decode logic 18 operates according to inputs from the processor 10. Two of these inputs are derived from particular pin positions within the socket in which the processor 10 is mounted. The first of these inputs, which produces a signal called VCC2DET, is provided by a contact surface 22 within the socket 24 in which the processor 10 is mounted. Within an SVP processor requiring a core voltage VCORE different from its I/O voltage VIO, the pin contacting the contact surface 22 is electrically grounded. On the other hand, within a UVP processor requiring only a single voltage, the pin contacting the contact surface 22 is electrically floating. The contact surface 22 is connected to a positive voltage V through a pull-up resistor 26, so that the VCC2DET signal is high when the surface 22 is floating and low when this surface 22 is grounded. The second of these inputs, which produces a signal called V2.2REQ, comes from a contact surface 28 within the socket 24 contacted by a grounded pin available only on AMD processors requiring a core voltage VCORE of 2.2 volts. This contact surface 28 is connected to a positive voltage V through a pull up resistor 30, so that a low level of V2.2REQ indicates that the processor needs a core voltage VCORE of 2.2 volts.

The remaining input to decode logic 18 is a data input, called CPUID, generated as the processor 10 executes a subroutine using instructions stored in instruction storage 32. This storage 32 is preferably a ROM (read-only memory) in which BIOS (Basic Input/Output System) instructions are stored, with the subroutine causing the CPUID data to be provided by the processor being a part of the BIOS instructions.

The apparatus 8 applies voltages to the pins of the core plane and to the pins of the I/O plane of the processor 10 according to the following table:

| PROCESSOR TYPE | VCC2DET | CORE VOLTAGE PLANE PINS | I/O VOLTAGE PLANE PINS |
| --- | --- | --- | --- |
| UVP | High | VCORE 3.5 v | VCORE 3.5 v |
| SVP | Low | VCORE 1.8–2.9 v | VFIX 3.5 v |

In each case, the VCORE output of the DC to DC convertor 14 is applied to the core voltage plane pins. The difference between the two processor types is determined by the level of VCC2DET. In a UVP processor, the output of the DC to DC convertor is set to 3.5 volts and is additionally applied to the I/O voltage plane pins.

In an SVP processor, the output of the DC to DC convertor 14 is applied only to the core voltage pins, while the fixed voltage VFIX of the regulator 12 is applied to the I/O voltage pins. Also in an SVP processor, the level of the output voltage VCORE from the DC to DC convertor 14 is varied in accordance with further determinations of the identity of the processor 10.

The only switching input to the switching circuit 20 is the VCC2DET signal, which is provided as an input to the gate of a first n-channel FET 34 (Field Effect Transistor) and as an input to the gate of a second n-channel FET 36. When VCC2DET is high, indicating a UVP processor, current flows through the first input FET 34 between its drain, which is connected to 5 volts through a 10 Kohm resistor 38, and its source, which is connected to electrical ground. This flow of current drives the gate of logically inverting FET 40 low, so that current does not flow between its drain, which is connected to 12 volts through a first 470 Kohm resistor 42. Without current flowing the logically inverting FET 40, the gates of switching FETs 44, 46 are held high through the resistor 42, so that current flows between the drain of FET 44 and the drain of FET 46, setting the VIO voltage applied to the I/O voltage plane pins of the processor 10 at the VCORE level of the core voltage plane pins. Also when VCC2DET is high, current flowing through a second 470 Kohm resistor 48, and between the drain of the second input FET 36, which is connected to this resistor 48, and the source of this FET 36, which is connected to ground, holds the gates of switching FETs 50, 52 low, preventing the flow of current at VFIX at 3.5v from regulator 12 into the VIO output of the switching circuit 20.

On the other hand, when VCC2DET is low, indicating an SVP processor, the gate of first input FET 34 is held low, so that current does not flow between the drain and source of this device. The gate of logically inverting FET 40 is held high by the application of 5 volts through the resistor 38, and the resulting flow of current between the drain and source of FET 40 brings the gates of switching FETs 44, 46 low, so that current does not flow through the switching FETs 44, 46. Also when VCC2DET is low, current does not flow through the second input FET 36, allowing the gates of switching FETs 50, 52 to be pulled high through resistor 48. Thus, current flows through these FETs 50, 52, applying the fixed VFIX level of 3.5 volts from the regulator 12 to drive the voltage VIO applied to the I/O voltage plane level pins of the processor 10.

The switching events within the switching circuit 20 can occur after the computing system is turned on, as soon as the 5-volt and 12-volt levels become available. The resulting switched states of the circuit 20 remain until these voltage levels are lost with powering the computing system down.

When VCC2DET is low, indicating an SVP processor, the core voltage VCORE needed for optimum operation of the processor may be one of several different levels. Within the decode logic, the level of V22REQ is used to determine an initial value of the voltage VCORE to be generated by the DC to DC convertor 14. Examples of the initial and final values for VCORE, following a determination that VCC2DET is low, are shown in the following table:

| V2.2REQ | PROCESSOR TYPE | VCORE INITIAL | FINAL |
|---|---|---|---|
| high | Intel PENTIUM MMX | 2.9 v | 2.8 v |
| high | IBM or Cyrix | 2.9 v | 2.9 v |
| low | AMD | 2.3 v | 2.2 v |
| low | AMD | 2.3 v | 2.4 v |

If the level of V2.2REQ is high, the installed processor 10 is, for example, either an Intel PENTIUM MMX processor, having an optimal core voltage of 2.8 volts, or an IBM or Cyrix processor, having an optimal core voltage of 2.9 volts. Initially, a determination between these processor types cannot be made, so the decode logic provides 18 inputs setting the VCORE output voltage of the DC to DC convertor 14 at 2.9 volts.

On the other hand, if the level of V2.2REQ is low, the installed processor 10 must be an AMD processor, since this is presently the only type of processor providing a grounded pin at the position used to develop the V2.2REQ signal. However, the knowledge that an AMD processor is installed is not sufficient to determine the optimal core voltage for the processor 10, since some AMD processors have an optimal core voltage of 2.2 volts, while other AMD processors have an optimal core voltage of 2.4 volts. Therefore, the decode logic 18 initially provides output signals causing the DC to DC convertor 14 to provide a VCORE output voltage having a compromise level of 2.3 volts.

In each of these cases, the level of V2.2REQ is used to bring the VCORE voltage, which becomes the VCORE voltage of the processor 10 to a level within 0.1 volt of the optimum level. While this level for the VCORE voltage is close enough to allow initial operation of the processor 10, it is still desirable to switch the VCORE voltage to the level specified for the particular processor 10. To this end, a subroutine executing in the processor 10 causes the processor 10 to provide a data input to the decode logic 18 in the form of data indicated as CPUID. This data identifies the type of processor 10, using information conventionally stored within the processor.

The circuits within decode logic 18 decode the CPUID information in a manner forming signals to be applied to the programming inputs 16 to the DC to DC convertor 14, so that the variable voltage VCORE is appropriate for the core voltage VCORE of a processor identified by the CPUID information. Since the information being decoded is relatively simple, and since the number of output states is relatively modest the decode process can be achieved through combinational logic, with one or more register(s) 54 being used to store information determining the variable voltage VCORE. The register(s) 54 are needed because of the transient nature of the CPUID signal from the processor 10, along with the need to maintain the core voltage VCORE at a chosen level during operation of the computing system. A register 54 may, for example, store serial data bits in the form of the CPUID, with the various outputs of the register, together with the VCC2DET and V2.2REQ signals in the decode logic 18, providing inputs to the combinational logic determining the programming inputs 16 to the DC to DC convertor 14. Alternately, the decode logic 18 may include, for example, an input register 54 storing the individual bits of the CPUID, a separate output register 55 storing individual bits, each of which determines the level of an individual programming input 16, and combinational logic converting the outputs of the input register 54 to inputs to the output register 55, in a manner providing the level of the variable voltage VCORE for each of the expected CPUID sequences.

The decode logic 18 may be implemented using a programmable logic array, with a data transmission connection between the processor 10 and the decode logic 18 being made through circuit lines dedicated to this purpose, or with such a connection being made through a general purpose bus used for one or more other purposes.

Figure 3:
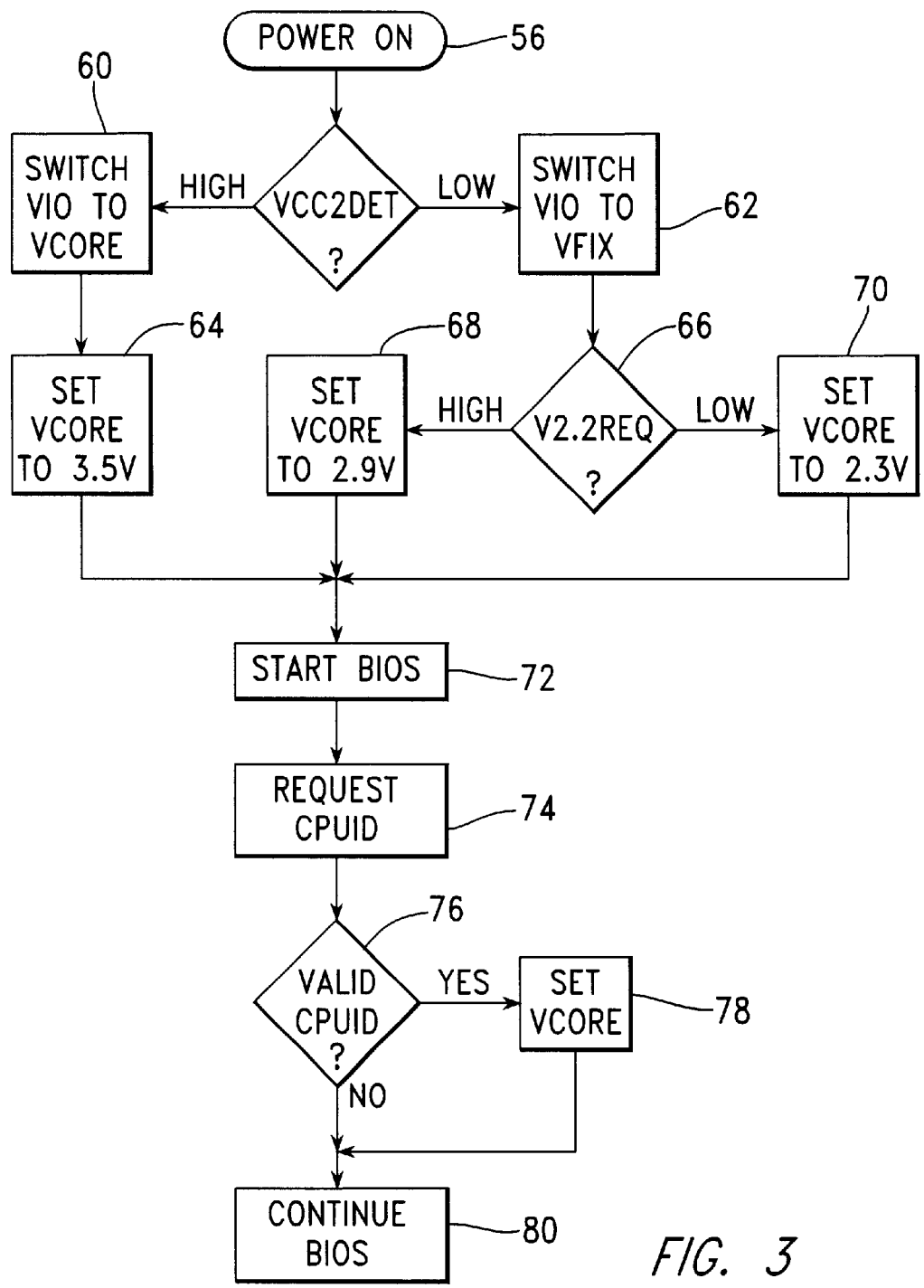
FIG. 3 is a flow chart showing processes occurring within the apparatus of FIG. 1 after the computer system of which this apparatus is a part has been powered up.

FIG. 3 is a flow chart of a process occurring in accordance with the present invention after the computing system is turned on in step 56. As soon as the 12-volt and 5-volt power supply levels become available, with a determination of the level of VCC2DET in step 58, the switching circuit 20 switches the VIO to either VCORE, in step 60, if VCC2DET is high, or to VFIX, in step 62, if VCC2DET is low, indicating a grounded pin. The decode logic 18 also determines the initial value to VCORE in response to the level of VCC2DET and V2.2REQ. If VCC2DET is high, in step 64, the decode logic 18 causes the DC to DC convertor 14 to provide a voltage level of 3.5 volts. Also if VCC2DET is low, in step 66, the decode logic 18 determines the level of V2.2REQ in step 66. If this level is high, the decode logic 18 sets VCORE to 2.9 volts in step 68, while, if this level is low, the decode logic 18 sets VCORE to 2.3 volts in step 70.

Regardless of the events occurring in steps 56 through 70, in accordance with the conventional operation of a computing system, the execution of BIOS code is automatically started as part of a power-up or initialization process in step 72. In accordance with a preferred version of the present invention, the BIOS code executed upon system start-up includes an instruction executed in step 74 to request a CPUID from the processor. The processor preferably next provides the CPUID, in a manner of which the descriptions of U.S. Pat. Nos. 5,671,435 and 5,794,066 are exemplary. Next, in step 76, the decode logic 18 determines if a valid. CPUID has been provided. For example, if the processor is of a legacy type not having a capability to provide the CPUID, a valid CPUID is not found. If the decode logic 18 finds that a valid CPUID has been found, the processor core voltage VCORE is set in step 78. Regardless of whether a valid CPUID is found, operation of the BIOS code continues in step 80.

While the invention has been described in its preferred form or embodiment with some degree of particularity, it is understood that this description has been given only by way of example and that numerous changes in the details of construction, fabrication and use, including the combination and arrangement of parts or process steps, may be made without departing from the spirit and scope of the invention.

What is claimed is:

1. Apparatus for providing electrical power to a processor having first and second power inputs within a computing system, wherein said apparatus comprises:
   a programmable power supply producing a variable output voltage as a function of a program input code;
   instruction storage, accessed by said processor during each power initialization sequence, wherein said instruction storage holds a program for execution within said processor, and wherein said program includes an instruction causing said processor to provide a processor identifying code indicating a type of said processor;
   decode logic receiving said processor identifying code and generating said program input code as a function of said processor identifying code;
   a first data connection, between said processor and said decode logic, wherein said processor identifying code is transmitted over said first data connection;
   a second data connection, between said decode logic and said programmable power supply, wherein said program input code is transmitted over said second data connection; and
   a first electrical power supply line between said programmable power supply and said first power input to said processor, wherein current is driven along said first electrical power supply line at said variable output voltage.

2. The apparatus of claim 1, wherein said decode logic includes a register storing data, determined from said processor identifying code, for continuous generation of said program input code.

3. The apparatus of claim 2, wherein
   said programmable power supply includes a plurality of program input terminals, and
   said program input code comprises a plurality of voltage signals applied to said plurality of input terminals.

4. The apparatus of claim 1, wherein said decode logic generates said program input code to cause a predetermined level of said variable output voltage to be generated by said programmable power supply in response to each code within a plurality of codes provided as said processor identifying code.

5. The apparatus of claim 1, wherein
   said apparatus additionally comprises a first input line connectable to a first pin within said processor,
   said first input line is additionally connected to a first biasing voltage through a resistance, whereby said first input line is driven to a first input voltage if said first pin is electrically floating within said processor and to a second input voltage if said first pin is electrically grounded within said processor, and
   said decode logic generates said program input code additionally as a function of a voltage level of said first input line.

6. The apparatus of claim 5, wherein
   said apparatus additionally comprises a second input line connectable to a second pin within said processor,
   said second input line is additionally connected to a second biasing voltage through a resistance, whereby said second input line is driven to a third input voltage if said second pin is electrically floating within said processor and to a fourth input voltage if said second pin is electrically grounded within said processor, and
   said decode logic generates said program input code additionally as a function of a voltage level of said second input line.

7. The apparatus of claim 1, additionally comprising:
   a fixed voltage power supply producing a fixed output voltage; and
   a switching circuit determining if said processor is a unified voltage plane type or a split voltage plane type, wherein said switching circuit applies said fixed output voltage to said first power input of said processor if said processor is of a unified voltage plane type and to a second power input of said processor if said processor is of said split voltage plane type.

8. The apparatus of claim 7, wherein
   said apparatus additionally comprises a first input line connectable to a first pin within said processor,
   said first input line is additionally connected to a first biasing voltage through a resistance, whereby said first input line is driven to a first input voltage if said first pin is electrically floating within said processor and to a second input voltage if said first pin is electrically grounded within said processor, and
   said switching circuit determines if said processor is said unified voltage plane type or said split voltage plane type as a function of a voltage level of said first input line.

9. The apparatus of claim 8, wherein said decode logic generates said program input code additionally as a function of a voltage level of said first input line.

10. The apparatus of claim 8, wherein
    said apparatus additionally comprises a second input line connectable to a second pin within said processor,
    said second input line is additionally connected to a second biasing voltage through a resistance, whereby said second input line is driven to a third input voltage if said second pin is electrically floating within said processor and to a fourth input voltage if said second pin is electrically grounded within said processor, and
    said decode logic generates said program input code additionally as a function of a voltage level of said second input line.

11. Apparatus for providing electrical power to a processor having first and second power inputs within a computing system, wherein said apparatus comprises:
- a first power supply connected to said first power input of said processor;
- a second power supply; and
- a switching circuit determining if said processor is a unified voltage plane type or a split voltage plane type, wherein said switching circuit connects said first power supply to said second power input of said processor if said processor is of said unified voltage plane type and wherein said switching circuit connects said second power supply to said second power input of said processor if said processor is of said split voltage plane type.

12. The apparatus of claim 11, wherein
said apparatus additionally comprises a first input line connectable to a first pin within said processor,
said first input line is additionally connected to a first biasing voltage through a resistance, whereby said first input line is driven to a first input voltage if said first pin is electrically floating within said processor and to a second input voltage if said first pin is electrically grounded within said processor, and
said switching circuit determines if said processor is said unified voltage plane type or said split voltage plane type as a function of a voltage level of said first input line.

13. A method for providing electrical power to a processor having first and second power inputs within a computing system, wherein said method comprises steps of:
- (a) determining whether said processor is a unified voltage plane type or a split voltage plane type;
- (b) applying a first voltage level to said first and second power inputs of said processor if said processor is said unified voltage plane type;
- (c) applying said first voltage level to said second power input of said processor if said processor is said split voltage plane type;
- (d) applying a second voltage level to said first power input of said processor if said processor is said split voltage plane type;
- (e) causing said processor to provide a processor identifying code, if said processor is said split voltage plane type; and
- (f) applying a third voltage level to said first power input of said processor, if said processor is said split voltage plane type, wherein said third voltage level is a function of said processor identifying code.

14. The method of claim 13, wherein, within step (a), said processor is determined to be said unified voltage plane type if a first processor socket contact terminal at a first pin location of said processor is determined to be connected to electrical ground, and of a split voltage plane type if said first processor socket contact is determined to be electrically floating.

15. The method of claim 14, wherein, within step (d), said second voltage level is determined as a function of whether a second processor socket contact at a second pin location of said processor is electrically grounded or electrically floating.

16. The method of claim 13, wherein, step (e) includes reading an instruction within a program automatically executing within said processor during a power-on sequence.

17. A method for providing electrical power to a processor within a computing system, wherein said method comprises steps of:
- (a) applying a first voltage level to a first power input of said processor;
- (b) beginning execution of a program within said processor during an initialization sequence occurring after power-on of said computing system;
- (c) causing said processor to provide a processor identifying code in response to an instruction within said program; and
- (d) applying a second voltage level to said first power input of said processor, wherein said second voltage level is determined as a function of said processor identifying code.

18. The method of claim 17, wherein said first voltage level is determined as a function of whether a processor socket contact at a pin location of said processor is electrically grounded or electrically floating.

19. A method for providing electrical power to a processor having a first power input connected to a programmable power supply and a second power input within a computing system, wherein said computing system additionally includes a fixed voltage power supply, and wherein said method comprises steps of:
- (a) determining whether said processor is a unified voltage plane type or a split voltage plane type;
- (b) if said processor is said unified voltage plane type, connecting said second power input to said programmable power supply, and programming said programmable power supply to generate a first voltage level;
- (c) if said processor is said split voltage plane type, causing said processor to provide a processor identifying code and programming said programmable power supply to generate a second voltage level as a function of said processor identifying code.

20. The method of claim 19, wherein, within step (a), said processor is determined to be said unified voltage plane type if a first processor socket contact terminal at a first pin location of said processor is determined to be connected to electrical ground, and of a split voltage plane type if said first processor socket contact is determined to be electrically floating.

21. The method of claim 19, wherein, within step (b), said first voltage level is determined as a function of whether a second processor socket contact at a second pin location of said processor is electrically grounded or electrically floating.

* * * * *